(12) United States Patent
Maroncelli et al.

(10) Patent No.: US 11,907,722 B2
(45) Date of Patent: Feb. 20, 2024

(54) METHODS AND APPARATUS FOR STORING PREFETCH METADATA

(71) Applicant: Arm Limited, Cambridge (GB)

(72) Inventors: Luca Maroncelli, Cambridge (GB); Harvin Iriawan, Cambridge (GB); Peter Raphael Eid, Nice (FR); Cédric Denis Robert Airaud, Saint Laurent du Var (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/724,600

(22) Filed: Apr. 20, 2022

(65) Prior Publication Data

US 2023/0342154 A1 Oct. 26, 2023

(51) Int. Cl.
*G06F 9/30* (2018.01)
*G06F 9/38* (2018.01)
*G06F 12/12* (2016.01)

(52) U.S. Cl.
CPC .......... *G06F 9/3802* (2013.01); *G06F 9/3851* (2013.01); *G06F 12/12* (2013.01)

(58) Field of Classification Search
CPC ....... G06F 9/3802; G06F 9/3851; G06F 12/12
See application file for complete search history.

(56) References Cited

U.S. PATENT DOCUMENTS

| | | | | |
|---|---|---|---|---|
| 5,493,667 | A * | 2/1996 | Huck | G06F 12/126 711/E12.075 |
| 5,974,508 | A * | 10/1999 | Maheshwari | G06F 12/126 710/200 |
| 6,044,478 | A * | 3/2000 | Green | G06F 12/126 711/E12.075 |
| 6,862,663 | B1 * | 3/2005 | Bateman | G06F 12/126 711/E12.075 |
| 7,502,890 | B2 * | 3/2009 | Kailas | G06F 12/126 711/133 |
| 2005/0071583 | A1 * | 3/2005 | Shepherd | G06F 9/30189 712/E9.034 |
| 2006/0179174 | A1 * | 8/2006 | Bockhaus | G06F 12/126 711/E12.075 |
| 2012/0331234 | A1 * | 12/2012 | Hirao | G06F 12/128 711/143 |

(Continued)

*Primary Examiner* — Corey S Faherty
(74) *Attorney, Agent, or Firm* — NIXON & VANDERHYE P.C.

(57) ABSTRACT

Aspects of the present disclosure relate to an apparatus comprising processing circuitry, prefetch circuitry and prefetch metadata storage comprising a plurality of entries. Metadata items, each associated with a given stream of instructions, are stored in the prefetch metadata storage. Responsive to a given entry of the plurality of entries being associated with the given stream associated with a given metadata item, the given entry is updated. Responsive to no entry of the plurality of entries being associated with the given stream associated with a given metadata item, an entry is selected according to a default replacement policy, the given stream is allocated thereto, and the selected entry is updated based on the given metadata item. Responsive to a switch condition being met, the default selection policy is switched to an alternative selection policy comprising locking one or more entries by preventing allocation of streams to the locked entries.

19 Claims, 7 Drawing Sheets

(56) References Cited

U.S. PATENT DOCUMENTS

| | | | |
|---|---|---|---|
| 2014/0164712 A1* | 6/2014 | Takamura | G06F 12/126 711/137 |
| 2015/0178212 A1* | 6/2015 | Takamura | G06F 12/0802 711/137 |
| 2018/0060099 A1* | 3/2018 | Shanbhogue | G06F 13/102 |

* cited by examiner

METHODS AND APPARATUS FOR STORING PREFETCH METADATA

BACKGROUND

The present technique relates to the field of processing circuitry, and more particularly to the storing of metadata associated with prefetching. Prefetching is the fetching of data (into temporary storage such as a cache) in advance of when it is to be processed by processing circuitry. This improves performance, as the data can be retrieved directly from the temporary storage when it is to be processed, which can be significantly faster than fetching from a longer-term storage such as a main memory.

Prefetching, which may be performed by a dedicated prefetch unit of a processor, thus comprises the making of predictions about what data will be processed in the near future, so that it can be prefetched. The prefetch performance is thus dependent on the accuracy of the prediction: if the predictions are inaccurate, the aforementioned performance increase will not be provided.

In some prefetchers, the prediction is performed based (at least in part) on metadata associated with the prefetching. For example, a given metadata item may define the current state of a given prediction, and may be updated over time to increase prediction accuracy. Given that the storage available to store such metadata cannot be unlimited, the storing of metadata can limit prefetch performance. There is thus a desire to improve the effectiveness of prefetch metadata storage, to thereby improve prefetch performance.

SUMMARY

At least some examples provide an apparatus comprising:
processing circuitry to process streams of instructions;
prefetch circuitry to prefetch data in advance of said data being processed by said streams of instructions; and
prefetch metadata storage to store metadata associated with said prefetching, the prefetch metadata storage comprising a plurality of entries and the prefetch circuitry being configured to:
  determine metadata items, each being associated with a given stream of instructions, for storage in the prefetch metadata storage;
  responsive to a given entry of the plurality of entries being associated with the given stream associated with a given metadata item, updating the given entry based on the given metadata item;
  responsive to no entry of the plurality of entries being associated with the given stream associated with a given metadata item:
    selecting an entry according to a default replacement policy;
    allocating said given stream to the selected entry; and
    updating the selected entry based on the given metadata item, and
  responsive to a switch condition being met, identifying one or more of said entries to lock, and switching said default selection policy to an alternative selection policy comprising locking each identified entry by preventing allocation of streams to the locked entries.

Further examples provide a method comprising:
making predictions of data in advance of said data being processed by processing circuitry; and
determining metadata items, each being associated with predictions of data for a given stream of instructions, for storage in metadata storage comprising a plurality of entries;
responsive to a given entry of the plurality of entries being associated with the given stream associated with a given metadata item, updating the given entry based on the given metadata item;
responsive to no entry of the plurality of entries being associated with the given stream associated with a given metadata item:
  selecting an entry according to a default replacement policy;
  allocating said given stream to the selected entry; and
  updating the selected entry based on the given metadata item, and
responsive to a switch condition being met, identifying one or more of said entries to lock, and switching said default selection policy to an alternative selection policy comprising locking each identified entry by preventing allocation of streams to the locked entries.

Further examples provide non-transitory computer-readable storage medium to store computer-readable code for fabrication of the above-described apparatus.

Further aspects, features and advantages of the present technique will be apparent from the following description of examples, which is to be read in conjunction with the accompanying drawings.

DESCRIPTION OF EXAMPLES

Figure 1:
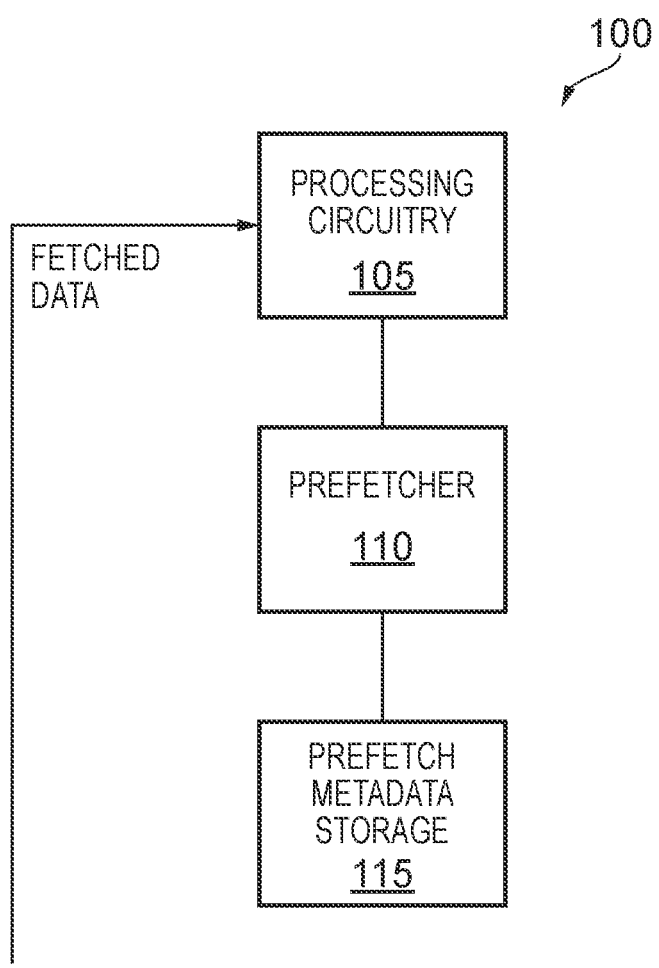
FIG. 1 depicts an apparatus according to an example.

As noted above, one example of the present disclosure provides an apparatus comprising processing circuitry, prefetch circuitry and prefetch metadata storage. The apparatus may be a processing device such as a central processing unit (CPU) or graphics processing unit (GPU).

The processing circuitry processes streams of instructions, which define processing operations to be performed on data. Each stream of instructions may for example be a sequence of instructions associated with a respective instruction address (for example by using a given program counter value). Alternatively or additionally, each stream may be associated with a given instruction opcode, and/or a given processor state (for example a streaming mode and/or exception level of the apparatus). As a particular example, each "stream" may be associated with a respective load-store operation having the given address.

The data and instructions may for example be retrieved from one or more storages, such as a main memory and one or more hierarchical caches. The processing circuitry may for example comprise one or more processing pipeline elements, such as a fetch stage and an execution stage.

The prefetch circuitry prefetches data in advance of the data being processed by the processing circuitry executing the aforementioned streams of instructions. For example, the prefetch circuitry may observe a pattern in the data being fetched for a given stream, and extrapolate that pattern into the future to predict instructions that will soon be fetched. The predicted instructions are then prefetched by the prefetch circuitry. In examples, the prefetch circuitry may process memory accesses, or memory accesses with miss in a local cache. Alternatively, the prefetch circuitry may directly process instruction streams.

The prefetch circuitry performs the predictions based on metadata, which is stored in the prefetch metadata storage. This may be a prefetch metadata cache. The prefetch metadata may for example be indicative of the above-described patterns, and be trained over time (based on noting accurate vs inaccurate predictions) to improve the prediction accuracy. The prefetch metadata storage comprises a plurality of entries.

In one example, each entry of the prefetch metadata includes the following metadata:

A tag: each training input of the prefetch circuitry (e.g., memory-bound instructions) is tagged by a hash of the entirety or part of its program counter (PC) and opcode. This tag is used to track streams (or patterns) and store stream-related info as there is a 1-to-1 mapping between streams and tags. In this example, 1 stream gets 1 prefetch metadata cache entry (in the limit of how many are available).

Pattern description data: In the present example, the prefetcher may track nested (or multi-dimensional) loop patterns. To do so, it tries to learn the values of a parametrized model of this kind of pattern. Typical examples of parameters are: offsets (in address space) for each dimension, counts for each dimension, last seen address (to compute offset). If the parametrized model is fixed, it is sufficient to store only the in-training and learnt values of the parameters. As per the previous point, those values can be learned on the stream of instructions sharing the same tag, and therefore, can be stored per tag; the metadata cache then becomes a 'dictionary' whose keys are the tags and whose values are the parameter values.

Confidence level: used to throttle or suppress generation for a given stream. It can be updated during training (e.g., decreased if there is a deviation or an inconsistency given what was observed/learnt previously for the stream).

Generation data: keeps track of how many predicted accesses in advance have been and are to be prefetched.

More generally, metadata for prefetching can include one or more of the following: history of addresses associated to accesses with a given tag, offsets found in program (untagged), indirection table (for pointer chasing).

The prefetch circuitry is configured to determine metadata items, based on which prefetching will be performed. Each metadata item is associated with a given stream of instructions, and may for example be updated as the prefetcher trains its predictions for the given stream.

For a given metadata item associated with a particular stream, it may be determined that there is already an entry of the metadata storage allocated to that stream. In that case, the prefetch circuitry updates the entry. For example, the update may be based on whether a prediction associated with the stream was accurate or inaccurate. The "update" may comprise training the given entry based on the given metadata item.

Alternatively, it may be determined that no entry of the plurality of entries is associated with the stream. That is to say, the entries may all be allocated to streams other than the current stream. In that case, the prefetch circuitry selects an entry of the prefetch metadata storage to evict, according to a default replacement policy. For example, it may use a "least recently used" policy, in which the entry which was least-recently accessed is evicted. The current stream is then allocated to the evicted entry.

In this manner, older metadata can be evicted to make way for new metadata. This may be more likely to be useful for prefetching. However, in some operating conditions, this may not lead to effective operation. For example, if the number of currently active streams is sufficiently high (e.g. higher than the number of entries in the prefetch metadata storage), and/or if there is no way left in the cache for the target set, entries may be evicted before they have been present for long enough to provide effective prefetching. In such circumstances, the prefetching can become less effective or ineffective.

The present example solves this problem by, responsive to a switch condition being met, identifying one or more prefetch metadata storage entries to lock. The default selection policy is accordingly switched to an alternative selection policy comprising locking each identified entry by preventing allocation of streams to the locked entries (in effect, by preventing eviction of the locked entries). This ensures that the locked entries can remain allocated for long enough that they can provide effective prefetching, even if they would have been evicted under the default replacement policy. Overall prefetch performance is thus improved.

In an example, the switch condition may be indicative of a number of active streams of instructions exceeding a capacity of the prefetch metadata storage. Thus, when the number of streams is within capacity, it can be assumed that the default replacement policy will effectively select appropriate entries to evict. However, when the capacity is exceeded and so the default policy breaks down (as described above), the prefetch circuitry switches to the alternative policy. This may be achieved by a switch condition that is met when a number of active streams of instructions exceeds a threshold, for example a threshold greater than the number of entries in the prefetch metadata storage.

The term "active stream" is used to mean a stream (e.g. associated with a particular instruction address expressed by way of a hash of the program counter) based on which instructions are currently being executed with associated data being prefetched. As particular examples, this may be a stream for which metadata has been received (i.e. for which a training event has occurred) within a current window and/or a window within a given number of previous windows. These windows may for example be a length of time, a number of processor cycles, or a number of instructions (e.g. load/store instructions) seen by the prefetch circuitry.

As an example, the prefetch circuitry may be configured to determine that the switch condition is met by counting, over a window, a number of received metadata items for which no metadata storage circuitry entry is associated with the associated stream and thus the prefetch circuitry allocates the associated stream to an entry. If this count exceeds a threshold (i.e. it is relatively frequent for new metadata to be allocated), the switch condition is deemed to have been met. This provides an effective way for assessing the extent to which prefetch metadata storage capacity has been reached or exceeded.

In this example, the switch condition may be that the count exceeds the threshold over a plurality of consecutive time windows (e.g. exceeding the threshold in each of the plurality). This reduces the chance that the replacement policy will be switched in response to a short-lived increase in the number of active streams, whilst still switching if the increase is longer-lived.

As described above, the alternative replacement policy is based on locking one or more entries. The number of locked entries may be anywhere from 0 to the entirety of the entries. The performance can depend on how these entries are selected: if inappropriate entries are locked, the performance increase may be reduced or eliminated. For non-locked entries, the default replacement policy may be applied.

In an example, the prefetch circuitry is configured to identify one or more recently-used entries as the entries to lock. Locking recently-used entries provides an effective way to lock a number of entries which are expected to be useful for prefetching in the near future. As a specific example, a "recently used" entry may be one which was accessed (e.g. updated) in a current window. This could be a fixed window or a rolling window. As for the windows described above, such a window may e.g. be a length of time, a number of processor cycles, or a number of instructions seen by the prefetch circuitry. Alternatively, a "recently-used" entry may be one which was updated within one or more latest time windows. Tracking usage within more than one window increases the likelihood of selecting entries that will continue to be useful for prefetching: it can be assumed that regularly-used entries are likely to continue to be regularly-used. In an example, this tracking is initiated when it is determined to activate the alternative replacement policy. Thus, it may be the case that no entries are locked in the first window, and then entries are locked later as information is acquired from the tracking.

In an example, whilst the alternative is active, the prefetch circuitry is responsive to determining that a locked entry is no longer recently-used to unlock the locked entry. This means that even if a locked entry was initially being regularly used, if access to that entry ceases then it does not remain locked indefinitely. Capacity is thus freed for a (potentially) more useful stream to be allocated to that entry.

Above has been described the switching to the alternative replacement policy, in response to the switch condition being met. In examples, the prefetch circuitry is responsive to a second switch condition being met to switch back to the default replacement policy. The second switch condition may indicate that the conditions that led to the alternative policy being imposed are no longer present. For example, the second switch condition may be indicative of a number of active streams of instructions being within a capacity of the prefetch metadata storage. Thus, when capacity is exceeded, the prefetch circuitry may switch to the alternative policy, and then when capacity drops back within capacity, the prefetch circuitry can switch back to the default policy.

One way of determining that capacity appears to have dropped back within capacity is to track the number of new metadata items for which entries would have been allocated, had the default replacement policy been active. These may be referred to as "dropped streams". If this number is high (e.g. within a window), it can be inferred that the default policy would lead to a high number new streams being allocated to prefetch metadata storage entries, which would lead to the problem discussed above (and which the alternative policy was introduced to address). Conversely, if this number falls, it can be inferred that the default policy would lead to a lower number of new streams being allocated, such that the problem would no longer arise. It is thus safe to switch back to the default policy (which may be expected to provide better prefetch performance, provided that the number of active streams is within capacity).

One way of implementing this is to maintain a confidence value for the alternative policy. If the number of dropped inputs is below a threshold within a window, the confidence value is decremented. Once the confidence value reaches e.g. zero, the replacement policy is switched back to the default.

Examples of the present disclosure will now be described with reference to the drawings.

FIG. 1 schematically shows an apparatus 100 according to an example of the present disclosure.

The apparatus 100 comprises processing circuitry 105, which processes instructions which act upon fetched data. The data may for example be fetched from a storage, such as a cache or main memory (not shown in FIG. 1).

The apparatus 110 comprises a prefetcher, which prefetches data prior to when it is to be processed by the processing circuitry 105. This effectively means that the data is fetched in advance (and, for example, stored in a fast-to-access storage such as a cache), so that it can be quickly retrieved by the processing circuitry 105. The prefetcher determines the data to prefetch by predicting the data that will be processed in the near future. This prediction is based on observing patterns of data access, and extrapolating such patterns into the future. For example, the prefetcher 110 may apply a stride-based prediction which looks for access to data having regularly-spaced addresses.

To support the prediction process, the prefetcher 110 has access to a prefetch metadata storage 115. The prefetch metadata storage stores metadata associated with the prediction process in the prefetch metadata storage 115. For example, the metadata may be indicative of the patterns of data access mentioned above. As a particular example, in the case of the above-described stride-based prefetcher, the stored metadata may comprise offsets and last-seen addresses or expected addresses. The prefetcher 110 may train the prefetch metadata storage 115 as continuing patterns of data access are observed, to increase the prediction accuracy.

Figure 2:
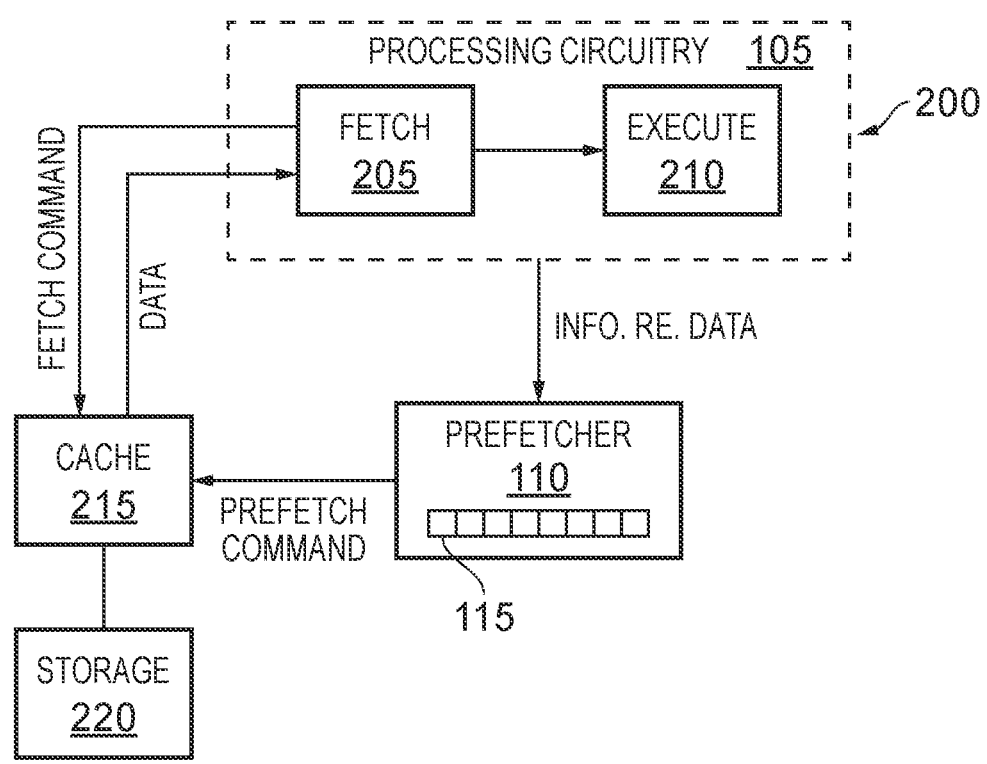
FIG. 2 depicts an apparatus according to an example.

FIG. 2 schematically depicts an apparatus 200 according to an example. The apparatus 200 may be considered a specific example of the apparatus 100 of FIG. 1.

The apparatus 200 comprises processing circuitry 105. In this example, the processing circuitry 105 comprises two pipelined stages: a data fetch unit 205, and an instruction execute unit 210. In other examples, the processing circuitry may comprise further units associated with the fetching and processing of instructions and data.

The data fetch unit 205 fetches data from cache 215 and/or storage 220. For example, it may fetch data which is required for execution of a given instruction. The cache 215 has a smaller capacity than the storage 220, but is faster to access. For example, the storage 220 may be a main memory of the apparatus 200. To fetch data, the fetch unit 205 issues a fetch command to the cache 215. If the data is stored in the cache, it is transmitted back to the fetch unit 205. Otherwise, the data is retrieved from the storage 220 and transmitted to the fetch unit 205. Thus, servicing the fetch command is slower if the data is not already in the cache 215. Either way, the fetched data is subsequently passed to the execution unit 210 for processing.

In order to increase the efficiency of the fetching process, the apparatus 200 comprises a prefetcher 110. The prefetcher 110 receives, from the processing circuitry 105, information indicative of the fetched data. It then predicts data which will be processed in the near future, and submits to the cache 215 prefetch requests for the predicted data. In response to a prefetch request, if the requested data is not already in the cache 215, it is prefetched from the storage 220 into the cache 215. This means that (assuming the prediction is correct) it will already be in the cache 215 when the corresponding fetch request is received from the fetch unit 205. This means that the fetch request can be serviced much more quickly than if the data had not been prefetched.

In order to perform the aforementioned predicting, the prefetcher 110 comprises a prefetch metadata cache 115. The metadata cache 115 comprises a series of entries, each of which stores metadata associated with a given "stream". In this example, a given "stream" is associated with a particular instruction address (for example expressed by way of a hash of a program counter).

Figure 3A:
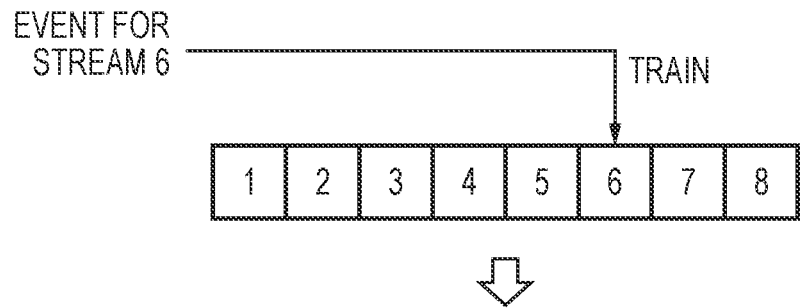
FIGS. 3A-3C depict metadata storage policies according to examples.
Figure 3B:
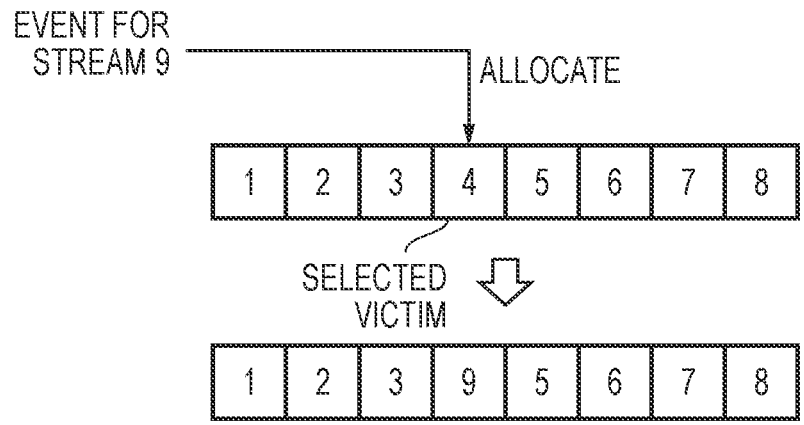

FIGS. 3A and 3B illustrate the updating of prefetch metadata cache entries.

When data is accessed for a given stream, the prefetcher 110 determines whether there is already an entry for that stream. FIG. 3A illustrates the behaviour when there is already an entry for that stream. In FIG. 3A, each entry stores metadata associated with a particular stream, the streams being numbered 1 to 8. An event is received for stream 6 (e.g. it is observed that data is fetched associated with stream 6). The prefetcher 110 accordingly trains the entry for stream 6 based on the fetched data. This improves the metadata, leading to improved metadata 6+.

FIG. 3B illustrates the behaviour when there is no entry for that stream. In FIG. 3B, as for 3A, metadata is stored for streams 1 to 8. However, in this case, data is fetched corresponding to new stream 9. The prefetcher selects a victim entry (in this case the entry for stream 4) and evicts it, storing metadata for stream 9 in its place. The selection of the victim entry is based on a replacement policy which aims to select less useful entries for eviction. This may for example be a "least recently used" policy in which the least-recently accessed entry is evicted.

Given a suitable replacement policy (many of which will be known to one skilled in the art), the procedures of FIGS. 3A and 3B can lead to effective prefetch performance, as less useful entries are evicted to make way for new entries. However, this can break down in certain situations, in particular when the number of active streams is larger than the capacity of the prefetch metadata storage 115. For example, in the present case, there may be a situation in which there are 9 active streams and data is accessed corresponding to each stream in turn. In this example, each access will have no corresponding entry at the time of access, and thus each access will lead to an eviction. This means that no useful prefetching will be performed, as each entry is evicted before it has time to be trained and to be used for prefetching.

Figure 3C:
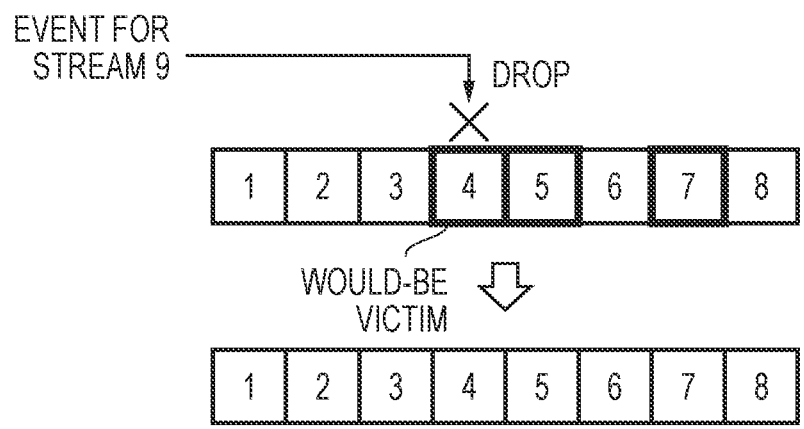

FIG. 3C shows an alternative replacement policy according to an example. The alternative replacement policy is built upon the default policy, as opposed to being a stand-alone new policy.

In FIG. 3C, as for FIGS. 2A and 2B, the prefetch metadata storage is initially populated with entries corresponding to streams 1 to 9. However, the entries for streams 4, 5 and 7 have been locked. As described elsewhere herein, these entries have been selected for locking because they were recently used and are thus deemed to be likely to be useful.

Similarly to FIG. 2B, a training event is received for new stream 9, and according to the default replacement policy this would lead to the entry for stream 4 being evicted. However, because this entry is locked, the training event for stream 9 is dropped and the entry for stream 4 is not evicted. Thus, after the training event is dropped, the prefetch metadata storage 115 still contains entries for streams 1 to 8, and not stream 9. In particular, the locked entry for stream 4 remains, and can be trained and used for prefetching.

Figure 4:
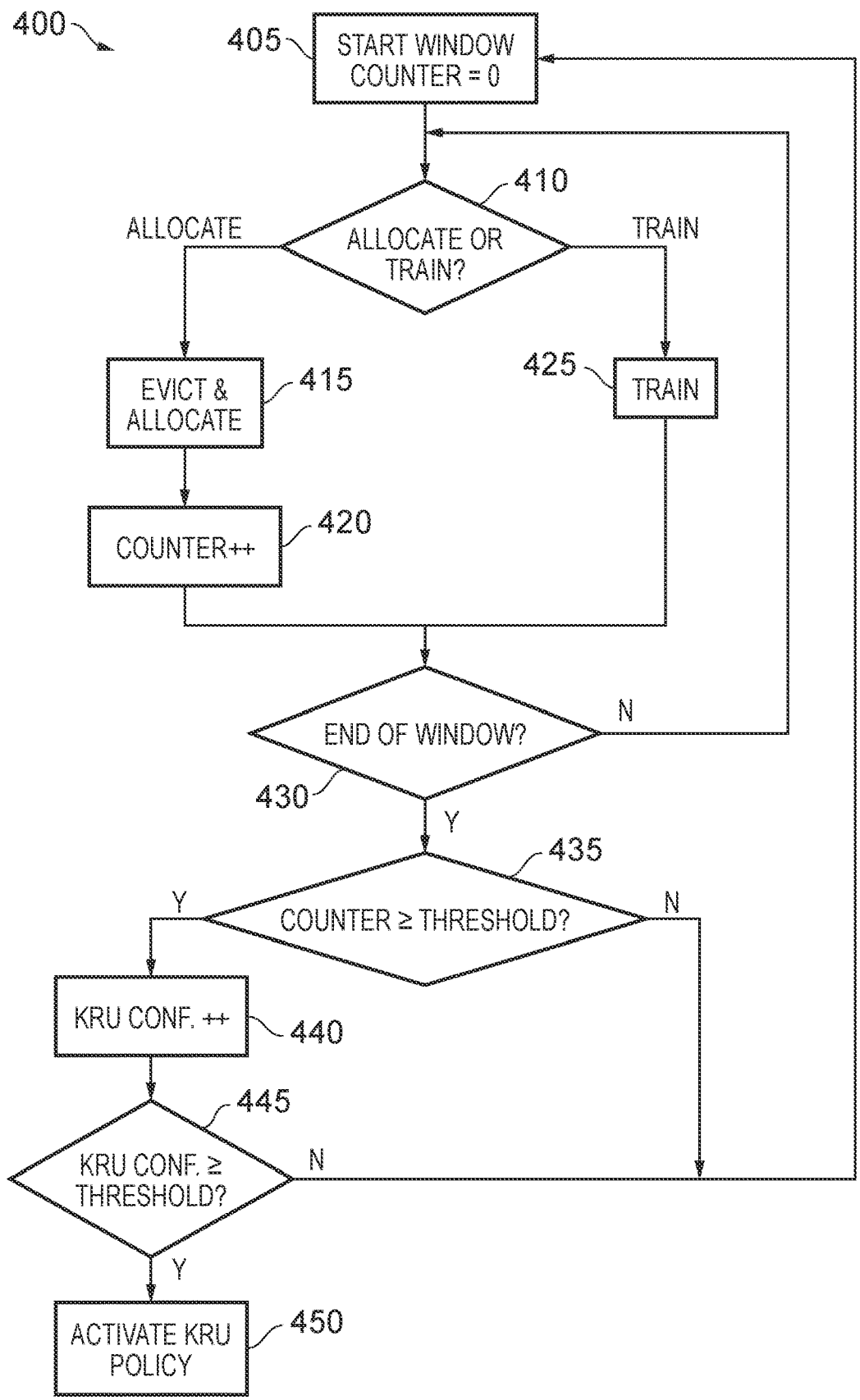
FIG. 4 depicts a method for activating a keep-recently-used policy according to an example.

The alternative replacement policy of FIG. 3C can be termed a "keep recently used" policy, because it locks one or more recently-used entries. FIG. 4 depicts an example method 400 for determining when to active this policy. The method is based on observing evictions over one or more windows. These windows may be expressed as a number of clock cycles, or as a number of training events (e.g. a number of executed load/store instructions which lead to updating of the prefetch metadata storage 115).

At block 405, a new window is started and a counter is set to zero. Then, at block 410, a new training event is received (i.e. data is accessed) for a given stream and it is determined whether this should lead to a new allocation in the prefetch metadata storage 115 or a training of an existing entry therein.

If it is determined that a new entry is to be allocated, at block 415 a victim entry is selected according to the default replacement policy and metadata associated with the new stream is allocated thereto. Then, at block 420, the counter is incremented.

Conversely, if an existing entry is to be trained (because there is already an entry for the given stream), that entry is trained at block 425.

Either way, at block 430 it is determined whether the end of the window has been reached. If so, flow proceeds to block 435. Otherwise, flow returns to block 410 where a new training event is received.

At block 435, it is determined whether the counter has reached a predetermined threshold. If not, flow returns to block 405 and a new window is started. If the threshold has been reached, a KRU (keep recently used) confidence value is incremented at 440.

At block 445, it is then determined whether the KRU confidence value has reached a threshold. If not, flow returns to block 405 and a new window is started. However, if the KRU confidence threshold has been reached, flow proceeds to block 450 where the KRU policy is activated. As part of activating the policy, one or more entries may be selected for locking. These may for example be entries which were accessed within one or more recent windows. Alternatively, initially no entries may be locked, after which entries can be locked over time as "recently used" entries are identified in subsequent windows.

The method of FIG. 4 thus provides a way of activating the KRU policy when the capacity of the prefetch metadata cache 115 is repeatedly exceeded. The specific threshold values referenced above can be optimised for a particular system, as a trade-off between activating the KRU policy earlier (when the default policy could still provide acceptable performance) and activating it too late (when the performance of the default policy has already dropped too low).

In examples, the KRU confidence may further be decremented at the end of a window when the counter is below the threshold. This means that the KRU confidence decays over time, helping to remove a "memory effect" and improving stability of the process.

Figure 5:
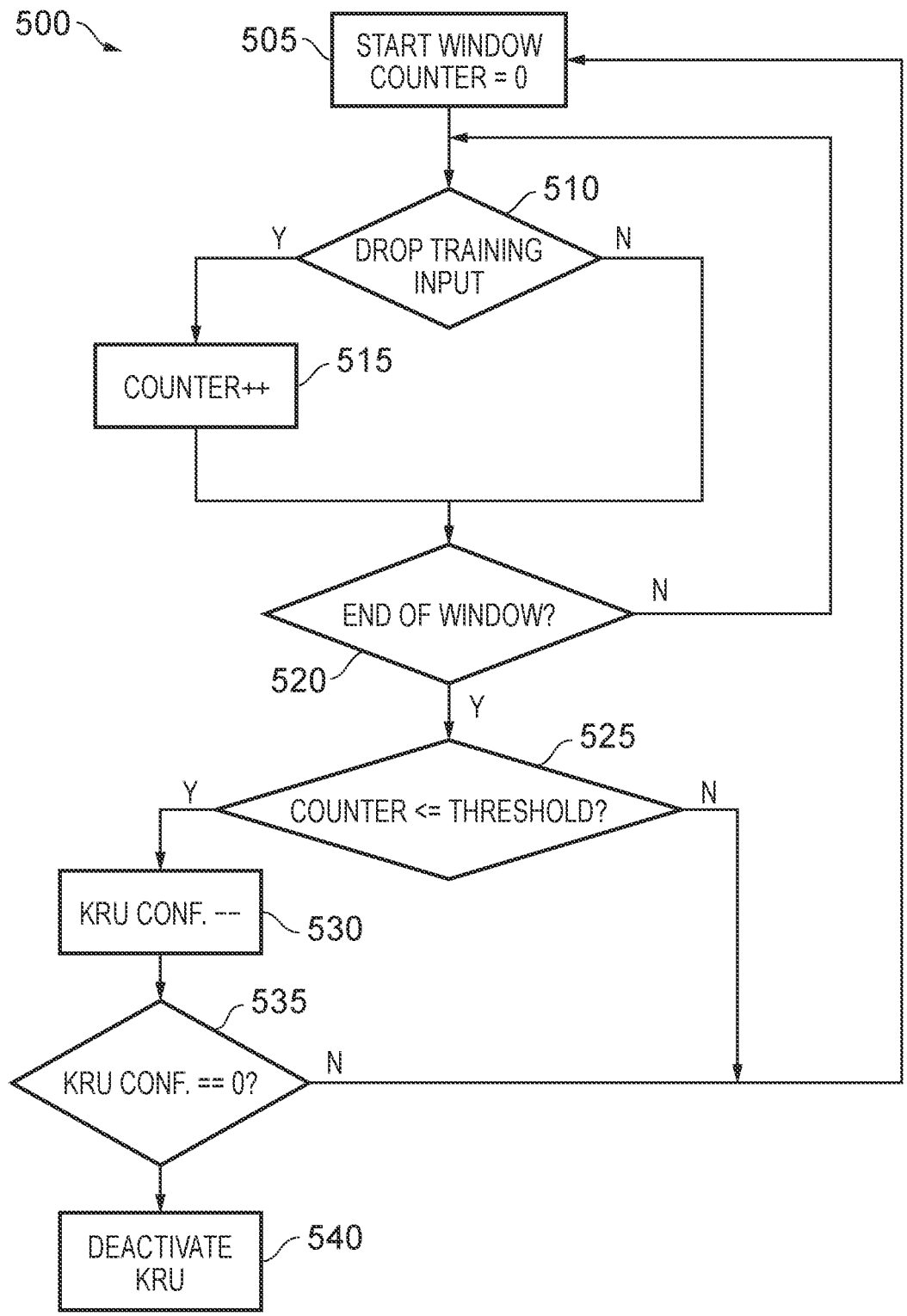
FIG. 5 depicts a method for activating a keep-recently-used policy according to an example.

FIG. 5 schematically depicts a method 500 for determining when to exit the KRU policy. This may for example be implemented after block 450 of FIG. 5 has been reached.

At block 505, a window is started and a counter is set to zero. The window may be the same window as that of FIG. 4, or may be a different window (e.g. a different size). This counter is a different counter from that of FIG. 4.

At block 510, a training input for a given stream is received and it is determined whether this training input is dropped (per FIG. 3C). If the training input is dropped, the counter is incremented at block 515.

Either way, flow proceeds to block 520 where it is determined whether the end of the window has been reached. If not, flow returns to 510 where a new training event is received.

If the end of the window has been reached, flow proceeds to block 525 where it is determined whether the counter is below a threshold. As for FIG. 4, this threshold can be optimised for a given system, with a higher value meaning that the system will tend to keep the KRU policy for longer. The threshold may be the same as the counter threshold of FIG. 4.

In examples, the KRU confidence may further be incremented at the end of a window when the counter is below the threshold. This helps to remove a "memory effect", similar to that noted above, and thus improves stability of the process.

If the counter remains above the threshold, flow returns to block 505 where a new window is started. If the counter is below the threshold, it can be taken as an indication that the KRU policy is no longer useful (e.g. because prefetch metadata cache capacity would no longer be exceeded). Flow accordingly proceeds to block 530 where the KRU confidence value (which started above its threshold value, per FIG. 4) is decremented.

At block 535, it is determined whether the KRU confidence value has dropped to zero. If not, flow returns to block 505 and a new window is started. However, if the KRU confidence has dropped to zero, flow proceeds to block 540 where the KRU policy is deactivated. Flow may then return to block 405 at the beginning of FIG. 4.

FIGS. 4 and 5 thus together provide effective methods for activating and deactivating the KRU policy. These methods may be used together, or separately (e.g. with alternative methods for determining when to activate and deactivate the policy).

Figure 6:
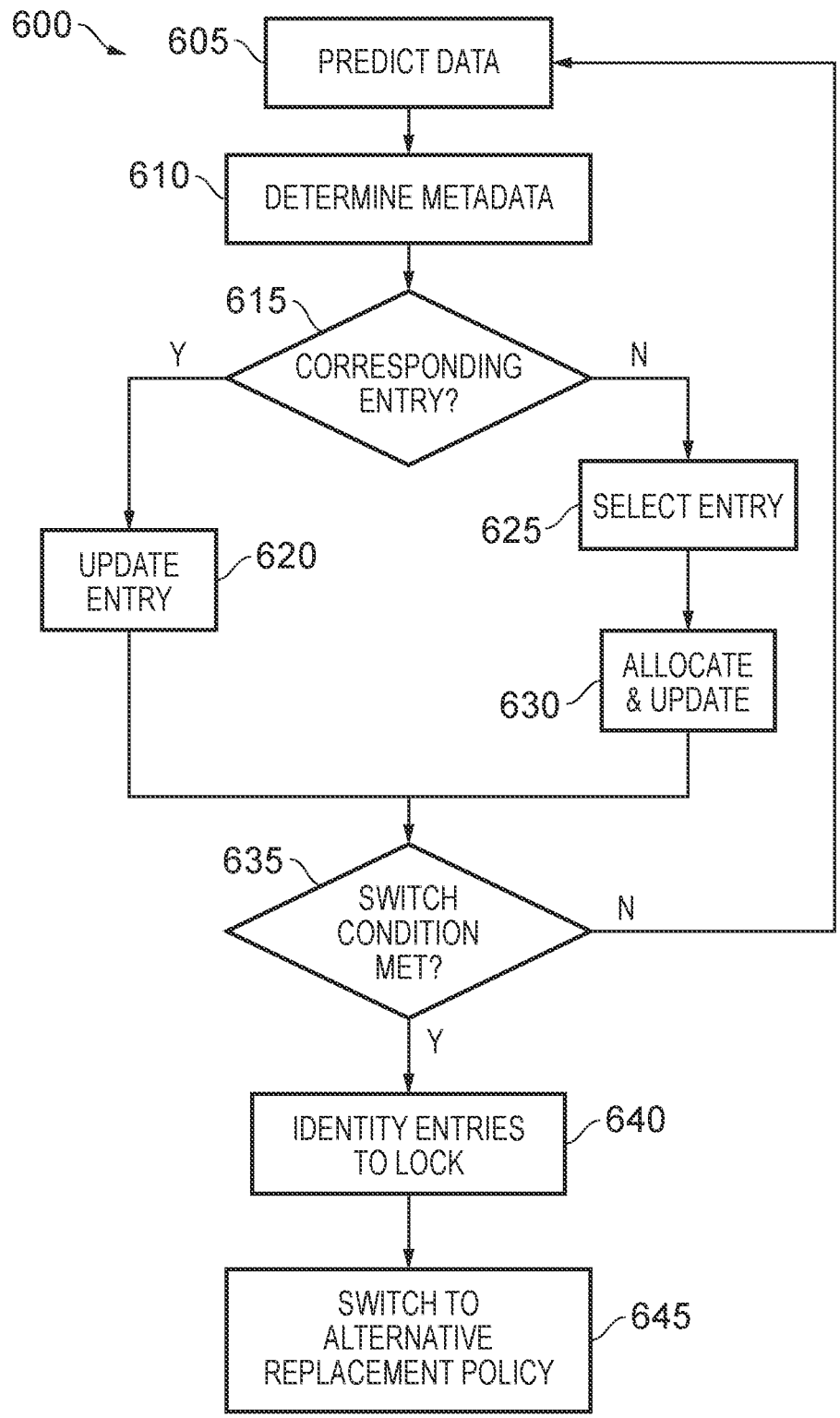
FIG. 6 depicts a method according to an example.

FIG. 6 depicts a method 600 according to an example. The method may be considered a more general example, of which FIG. 4 shows a specific implementation. The method 600 may be implemented by the apparatuses 100, 200 of FIGS. 1 and 2.

At block 605, predictions are made of data which will be required for processing. At block 610, metadata associated with a given data access is determined. In some examples, the metadata contribution from a given access is relatively small, but it takes on a fuller meaning when combined with stream metadata (in cases in which the data access does match a previously stored stream).

At block 615, it is determined whether there is a corresponding entry, in prefetch metadata storage, for an instruction stream to which the metadata relates. If there is already a corresponding entry, flow proceeds to block 620 where that entry is updated. Otherwise, flow proceeds to block 625 where an entry is selected for eviction according to a default replacement policy. The new metadata is then allocated to the evicted entry at block 630 and the entry is updated based thereon.

Either way, flow proceeds to block 635 where it is determined whether a switch condition has been met. For example, the switch condition may be indicative of a number of active streams exceeding a capacity of the prefetch metadata storage.

If the condition has not been met, flow returns to the beginning. If the condition has been met, flow proceeds to block 640 where one or more prefetch metadata storage entries are identified for locking. As described above, these may be one or more recently used entries.

Then, at block 645, an alternative replacement policy is switched to, in which the identified entries are locked. The method of FIG. 6 thus provides an effective way to implement an alternative replacement policy such as the KRU policy discussed above.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 7:
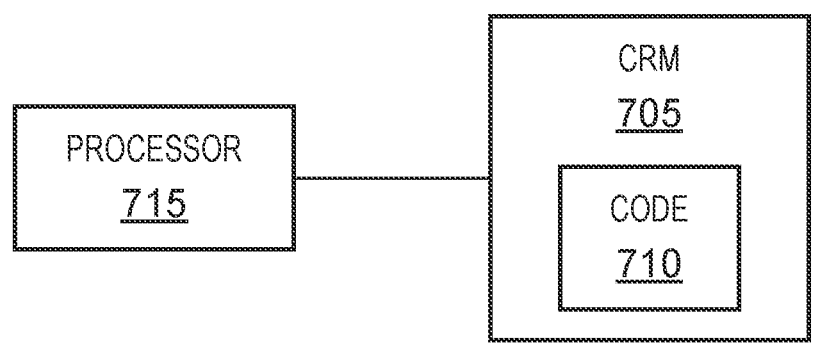
FIG. 7 depicts a computer-readable storage medium according to an example.

FIG. 7 shows an example of such a computer-readable medium 705, which comprises code 710 for fabrication of one or more of the apparatuses described herein when executed by processor 715.

Apparatuses and methods are thus provided for activating and deactivating an alternative replacement policy which From the above description it will be seen that the techniques described herein provides a number of significant benefits. In particular, techniques mitigate performance reductions that can arise when the capacity of a metadata prefetch storage is exceeded.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation. Furthermore, certain elements are described above as being implemented as "circuitry". One skilled in the art will appreciate that these, and other apparatus elements described above, may be implemented in dedicated circuitry or, alternatively or additionally, as functional units of a general-purpose processor.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the present disclosure are set out in the following numbered clauses:

1. An apparatus comprising:
    processing circuitry to process streams of instructions;
    prefetch circuitry to prefetch data in advance of said data being processed by said streams of instructions; and
    prefetch metadata storage to store metadata associated with said prefetching, the prefetch metadata storage comprising a plurality of entries and the prefetch circuitry being configured to:
        determine metadata items, each being associated with a given stream of instructions, for storage in the prefetch metadata storage;
        responsive to a given entry of the plurality of entries being associated with the given stream associated with a given metadata item, updating the given entry based on the given metadata item;
        responsive to no entry of the plurality of entries being associated with the given stream associated with a given metadata item:
            selecting an entry according to a default replacement policy;
            allocating said given stream to the selected entry; and
            updating the selected entry based on the given metadata item, and
        responsive to a switch condition being met, identifying one or more of said entries to lock, and switching said default selection policy to an alternative selection policy comprising locking each identified entry by preventing allocation of streams to the locked entries.
2. An apparatus according to clause 1, wherein the switch condition is indicative of a number of active streams of instructions exceeding a capacity of the prefetch metadata storage.
3. An apparatus according to clause 2, wherein the switch condition is that a number of active streams of instructions exceeds a threshold.
4. An apparatus according to clause 3, wherein the threshold is greater than the number of entries in said plurality of entries.
5. An apparatus according to any of clauses 2 to 4, wherein an active stream is a stream for which metadata has been received within at least one of:
    a current window; and
    a window within a given number of previous windows.
6. An apparatus according to any preceding clause, wherein the prefetch circuitry is configured to determine that the switch condition is met by:
    counting, over a window, a number of received metadata items for which no metadata storage circuitry entry is associated with the associated stream and thus the prefetch circuitry allocates the associated stream to an entry; and
    responsive to said count exceeding a threshold, determining that the switch condition is met.
7. An apparatus according to clause 6, wherein the prefetch circuitry is configured to determine that the switch condition is met responsive to said count exceeding the threshold over a plurality of consecutive time windows.
8. An apparatus according to any preceding clause, wherein said updating a given entry based on a given metadata item comprises training said given entry based on the given metadata item.
9. An apparatus according to any preceding clause, wherein the prefetch circuitry is configured to identify one or more recently-used entries as said one or more entries to lock.
10. An apparatus according to clause 9, wherein a recently-used entry is at least one of:
    an entry which was updated in a current window;
    an entry which was updated within one or more latest windows; and
    an entry which was updated within a current rolling window.
11. An apparatus according to clause 9 or clause 10, wherein the prefetch circuitry is responsive to determining that a locked entry is no longer recently-used to unlock said locked entry.
12. An apparatus according to any preceding clause, wherein the prefetch circuitry is responsive to a second switch condition being met to switch from the alternative replacement policy to the default replacement policy.

13. An apparatus according to any clause 12, wherein the second switch condition is indicative of a number of active streams of instructions being within a capacity of the prefetch metadata storage.

14. An apparatus according to clause 12 or clause 13, wherein the second switch condition is that a number of metadata items, for which entries would have been allocated according to the default replacement policy, is below a threshold within a time window.

15. An apparatus according to clause 14, wherein the prefetch circuitry is configured to determine said number by counting a number of dropped streams within said time window.

16. An apparatus according to any preceding clause, wherein the prefetch circuitry is configured to:
   when the default replacement policy is active, perform said prefetching based on the plurality of entries;
   when the alternative replacement policy is active, perform said prefetching based on the locked entries.

17. An apparatus according to any preceding clause, wherein each said stream is associated with at least one of:
   a respective processing operation having with a given address;
   an opcode of said respective processing operation; and
   a processor state.

18. An apparatus according to clause 17, wherein each said stream is associated with a respective load-store operation having the given address.

19. A method comprising:
   making predictions of data in advance of said data being processed by processing circuitry; and
   determining metadata items, each being associated with predictions of data for a given stream of instructions, for storage in metadata storage comprising a plurality of entries;
   responsive to a given entry of the plurality of entries being associated with the given stream associated with a given metadata item, updating the given entry based on the given metadata item;
   responsive to no entry of the plurality of entries being associated with the given stream associated with a given metadata item:
      selecting an entry according to a default replacement policy;
      allocating said given stream to the selected entry; and
      updating the selected entry based on the given metadata item, and
   responsive to a switch condition being met, identifying one or more of said entries to lock, and switching said default selection policy to an alternative selection policy comprising locking each identified entry by preventing allocation of streams to the locked entries.

20. A non-transitory computer-readable storage medium to store computer-readable code for fabrication of an apparatus according to any of clauses 1 to 18.

We claim:
1. An apparatus comprising:
processing circuitry to process streams of instructions;
prefetch circuitry to prefetch data in advance of said data being processed by said streams of instructions; and
prefetch metadata storage to store metadata associated with said prefetching, the prefetch metadata storage comprising a plurality of entries and the prefetch circuitry being configured to:
   determine metadata items, each being associated with a given stream of instructions, for storage in the prefetch metadata storage;
   responsive to a given entry of the plurality of entries being associated with the given stream associated with a given metadata item, updating the given entry based on the given metadata item;
   responsive to no entry of the plurality of entries being associated with the given stream associated with a given metadata item:
      selecting an entry according to a default replacement policy;
      allocating said given stream to the selected entry; and
      updating the selected entry based on the given metadata item, and
   responsive to a switch condition being met, identifying one or more of said entries to lock, and switching said default selection policy to an alternative selection policy comprising locking each identified entry by preventing allocation of streams to the locked entries,
   wherein the switch condition is indicative of a number of active streams of instructions exceeding a capacity of the prefetch metadata storage.

2. An apparatus according to claim 1, wherein the switch condition is that a number of active streams of instructions exceeds a threshold.

3. An apparatus according to claim 2, wherein the threshold is greater than the number of entries in said plurality of entries.

4. An apparatus according to claim 1, wherein an active stream is a stream for which metadata has been received within at least one of:
   a current window; and
   a window within a given number of previous windows.

5. An apparatus according to claim 1, wherein the prefetch circuitry is configured to determine that the switch condition is met by:
   counting, over a window, a number of received metadata items for which no metadata storage circuitry entry is associated with the associated stream and thus the prefetch circuitry allocates the associated stream to an entry; and
   responsive to said count exceeding a threshold, determining that the switch condition is met.

6. An apparatus according to claim 5, wherein the prefetch circuitry is configured to determine that the switch condition is met responsive to said count exceeding the threshold over a plurality of consecutive time windows.

7. An apparatus according to claim 1, wherein said updating a given entry based on a given metadata item comprises training said given entry based on the given metadata item.

8. An apparatus according to claim 1, wherein the prefetch circuitry is configured to identify one or more recently-used entries as said one or more entries to lock.

9. An apparatus according to claim 8, wherein a recently-used entry is at least one of:
   an entry which was updated in a current window;
   an entry which was updated within one or more latest windows; and an entry which was updated within a current rolling window.

10. An apparatus according to claim 8, wherein the prefetch circuitry is responsive to determining that a locked entry is no longer recently-used to unlock said locked entry.

11. An apparatus according to claim 1, wherein the prefetch circuitry is responsive to a second switch condition being met to switch from the alternative replacement policy to the default replacement policy.

12. An apparatus according to claim 11, wherein the second switch condition is indicative of a number of active streams of instructions being within a capacity of the prefetch metadata storage.

13. An apparatus according to claim 11, wherein the second switch condition is that a number of metadata items, for which entries would have been allocated according to the default replacement policy, is below a threshold within a time window.

14. An apparatus according to claim 13, wherein the prefetch circuitry is configured to determine said number by counting a number of dropped streams within said time window.

15. An apparatus according to claim 1, wherein the prefetch circuitry is configured to:
when the default replacement policy is active, perform said prefetching based on the plurality of entries;
when the alternative replacement policy is active, perform said prefetching based on the locked entries.

16. An apparatus according to claim 1, wherein each said stream is associated with at least one of:
a respective processing operation having with a given address;
an opcode of said respective processing operation; and
a processor state.

17. An apparatus according to claim 16, wherein each said stream is associated with a respective load-store operation having the given address.

18. A method comprising:
making predictions of data in advance of said data being processed by processing circuitry; and
determining metadata items, each being associated with predictions of data for a given stream of instructions, for storage in metadata storage comprising a plurality of entries;
responsive to a given entry of the plurality of entries being associated with the given stream associated with a given metadata item, updating the given entry based on the given metadata item;
responsive to no entry of the plurality of entries being associated with the given stream associated with a given metadata item:
selecting an entry according to a default replacement policy;
allocating said given stream to the selected entry; and
updating the selected entry based on the given metadata item, and
responsive to a switch condition being met, identifying one or more of said entries to lock, and switching said default selection policy to an alternative selection policy comprising locking each identified entry by preventing allocation of streams to the locked entries,
wherein the switch condition is indicative of a number of active streams of instructions exceeding a capacity of the prefetch metadata storage.

19. A non-transitory computer-readable storage medium to store computer-readable code for fabrication of an apparatus comprising:
processing circuitry to process streams of instructions;
prefetch circuitry to prefetch data in advance of said data being processed by said streams of instructions; and
prefetch metadata storage to store metadata associated with said prefetching, the prefetch metadata storage comprising a plurality of entries and the prefetch circuitry being configured to:
determine metadata items, each being associated with a given stream of instructions, for storage in the prefetch metadata storage;
responsive to a given entry of the plurality of entries being associated with the given stream associated with a given metadata item, updating the given entry based on the given metadata item;
responsive to no entry of the plurality of entries being associated with the given stream associated with a given metadata item:
selecting an entry according to a default replacement policy;
allocating said given stream to the selected entry; and
updating the selected entry based on the given metadata item, and
responsive to a switch condition being met, identifying one or more of said entries to lock, and switching said default selection policy to an alternative selection policy comprising locking each identified entry by preventing allocation of streams to the locked entries,
wherein the switch condition is indicative of a number of active streams of instructions exceeding a capacity of the prefetch metadata storage.

* * * * *